INVENTOR.
RALPH J. RHINES
BY

Patented Feb. 19, 1952

2,586,261

UNITED STATES PATENT OFFICE 2,586,261

ANIMAL TRAP

Ralph J. Rhines, Tacoma, Wash.

Application June 26, 1946, Serial No. 679,473

6 Claims. (Cl. 43—82)

This invention relates to animal traps, and more especially to mouse and rat traps.

The chief object of the invention is to provide a relatively simple, cheap and practicable form of trap, that may be constructed of wire or other suitable material, and operable by means of a simple and novel trigger mechanism for closing the spring-set jaw upon the animal.

Another object of the invention is to provide, in a trap of the kind referred to, a base, a jaw pivoted to the base and spring-set to normally close upon the base, a two-part, buckling trigger member for supporting the spring-set jaw in an upraised or "set" position, the parts of the trigger member being hingedly connected at one end and at their opposite ends to the base and jaw respectively, the hinged joint of the parts being designed and arranged to buckle or thrust slightly outward for supporting the trigger parts in substantial vertical alignment and the jaw in upraised or set position, but to permit the parts to buckle fully inward under pressure for collapsing the jaw upon the trapped mouse, rat or other animal, and a bait hook connected with and extending outwardly from the joint of the trigger member, so that as the animal pushes against the bait thereon in eating same, the parts of the trigger member will buckle fully inward and allow the spring-set jaw to collapse upon the animal.

With these stated objects in view, together with such other objects and advantages as may appear from the specification, attention is now directed to the accompanying drawing, wherein Figure 1 is a top plan view of a trap as constructed in accordance with this invention.

Figure 1:
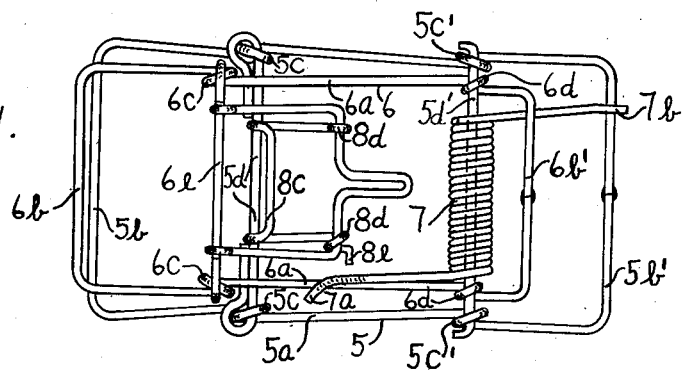

The trap as here shown is constructed of wire, and comprises an oblong and rectangular base 5, including spaced side wires 5a connected by end wires 5b, 5b' the side wires 5a being formed with transversely aligned eyes 5c, 5c', respectively, in substantially equi-spaced relation from the end wires 5b, 5b', respectively and the base being then completed by passing cross wires 5d and 5d' respectively through the eyes 5c, 5c', respectively and bending over the ends as shown, 5d representing the front cross wire, while 5d' represents the rear cross wire.

A similar oblong and rectangular jaw member 6, also of wire but of smaller dimensions than the base, is provided, the same including spaced side wires 6a, connecting end wires 6b, 6b' and transversely aligned eyes 6c, 6d, spaced from the ends 6b, 6b', respectively, and with the rear cross wires 5d' of the base passed freely through the rear eyes 6d of the jaw, for hingedly connecting these members. A trigger cross wire 6e is seated through the frontal eyes 6c of the jaw 6 with ends bent over as shown at 6f to hold it in place (see Figure 4). A coil spring 7 is seated over the rear cross wire 5d' of the base, with its inner extended end bent outwardly and passed over one of the side wires 6a of the jaw as at 7a, while the opposite end of the spring is extended straightly back over the end 5b' of the base, as at 7b. Thus with the spring 7 properly tensioned, the jaw 6 is pressed closely to the base 5. It is to be noted that the forward end of the jaw overlies the forward end of the base and is turned downward thereover (see Figure 2) to enable it to function effectively in holding a trapped animal such as a mouse or rat. It is also to be noted that the rear end of the jaw falls within the base and is turned upwardly from its point of pivotal connection with the base at 5c' (Figure 2), thus forming a handle means 6b'. Thus by pressing downward upon this upturned rear end of the jaw as indicated at 6b in Figure 2 the forward end thereof is raised against spring pressure, for the purpose of setting the trap.

To complete the trap, a two-part trigger member 8 is provided, comprising openly formed wire loops 8a, 8b, the bight of the lower loop 8a being turned up underneath the forward cross wire 5d of the base 5, as at 8c, for pivotally locking this loop in place on the base. The free ends of this loop are then coiled freely around the bight of the upper loop 8b, as at 8d, the extremity of the coil of one free end being turned out laterally behind the adjacent leg of the upper loop 8b, as at 8e, for the purpose of preventing the loops from buckling too far outwardly. The bight of the loop 8b is also formed with an outturned bait hook or slot 8f for holding a piece of bait as indicated in dotted lines at 9. The free ends of the upper loop 8b are finally coiled freely around the trigger cross wire 6e of the jaw 6, as indicated at 8g.

The trap is set by merely pressing down upon the up-turned rear end 6b' of the jaw member 6, thus raising the forward end thereof and straightening the trigger parts or loops 8a, 8b, up vertically for propping the jaw to its raised or set position. The trigger parts are then moved slightly outward or until these parts are buckled slightly outward or forward of the common plane of the parts and the extremity 8e of the coil 8d impinges the leg 8b, for releasably holding the trigger parts to such slightly outthrust position under the urge of the spring-set jaw 6. Suitable bait is then fastened onto the bait hook 8f, which completes the trap setting operation. When the mouse or rat or other animal attempts to eat of the bait, he necessarily pushes it and the trigger parts inwardly and rearwardly of the plane of alignment of the trigger parts, whereupon the spring urged jaw closes down in a flash, with the trigger parts collapsing inwardly and the jaw falling upon and trapping the animal.

The assemblage thus described presents a number of important advantages. For instance, in the all wire construction illustrated, in which the structure takes on a skeletonized formation, with the connections between parts (generally of pivotal type) so formed as to be loose relatively to each other, the structure permits of complete cleansing at will, whether the cleansing be simply that of dousing with water or by forming a sudsy hot water bath, the assemblage then being dried without danger of affecting the connections through the presence of concealed water. The advantages of this lies in the fact that the assemblage is thus freed from the scent of any previously trapped animals, thus avoiding one of the conditions frequently found in trap constructions, the presence of such scent frequently causing a succeeding animal to refuse to take the bait.

Figure 2:
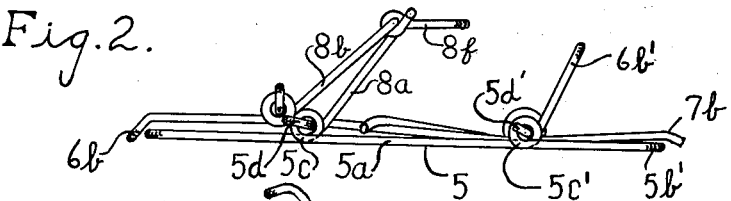
Figure 2 is a side elevational view of the trap assembly as shown in Figure 1.
Figure 3:
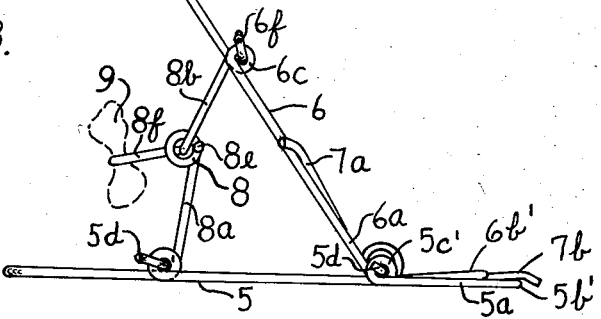
Figure 3 is a view similar to that of Figure 2, showing however the trap jaw as upraised and so supported by means of the two-part trigger member.
Figure 5:
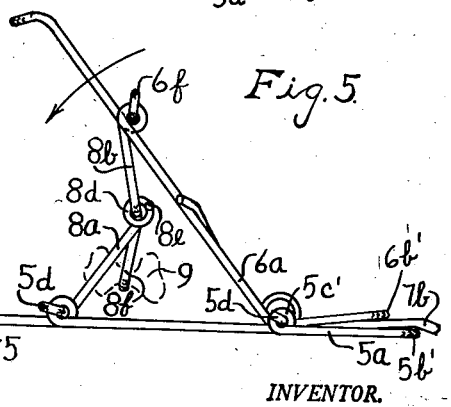
Figure 5 is a view similar to that of Figure 3, the trap being shown however as in "sprung" position, with the jaw closing down as indicated by the arrow.

Another, and more important, advantage is made evident during setting of the trap. Since the bait carrier 8f projects rearwardly when the assemblage is in sprung position, as indicated in Fig. 2, the assemblage is baited entirely rearward of the movable element or jaw 6 and while the latter is in the sprung position. In such position, the handle 6b' projects upward as shown in said figure. With the bait in position, the assemblage is grasped by the fingers at its rear end, with the thumb located on the handle 6b'. The assemblage is then shifted to a downwardly inclined position, with the front end downward, in which position pressure is applied by the thumb on the handle, thus rotating the movable element 6 on its pivot (rear cross-rod 5d') to raise the front end of this element or jaw to a point where the two members 8a and 8b of the tripping unit are alined (the straight line position of these members and which limits the extent of raising movement). During this raising movement of the movable element, the articulated members 8a and 8b have certain relative movements, member 8b having its outer end moving with the movable element with its opposite end interconnected with the upper end of member 8 to produce a toggle joint effect. During these movements, the bait carrier 8f is shifted to a position in front of the toggle-joint, as member 8b moves, thus placing the bait forward of the tripping unit, as indicated in Fig. 3; an intermediate position of the bait carrier is shown in Fig. 5. When the members 8a and 8b are in the straight line position, with the assemblage downwardly inclined, the weight of the bait carrier and bait is on the lower side of such line. Hence, by slowly releasing the pressure on handle 6b', this weight is effective to move the toggle joint downward to break the straight line condition by moving the joint to the opposite side of such line, this effect being produced as the movable element slowly moves in its closing direction as the pressure is lowered. This movement of the toggle-joint is limited by the contact of stop 8e with a leg of member 8b, which locks the assemblage against further collapse in this direction, thus completing the set condition of the assemblage with the movable element raised and under the spring tension, with the latter maintaining the assemblage from collapsing since the toggle-joint is slightly beyond the dead center position with stop 8e opposing the spring pressure.

The advantage in this respect comes from the fact that the setting activities all center about the movements of handle 6b', located in the rear zone of the assemblage and in rear of the upstanding jaw 6; hence, there is no danger to the fingers of the operator, since the fingers are in rear of and spaced from the portion of the jaw which becomes active upon the animal being trapped, and as a result there is no danger in setting. Since at least a part of this regimen is applied after the assemblage has been tripped and the animal trapped, the movable element need be raised only a distance sufficient to release the trapped animal. The fingers of the operator do not come in contact with the animal at any time during the release. This latter feature is a very positive advantage to those operators who have an innate repugnance to any contact with the animal itself.

Figure 4:
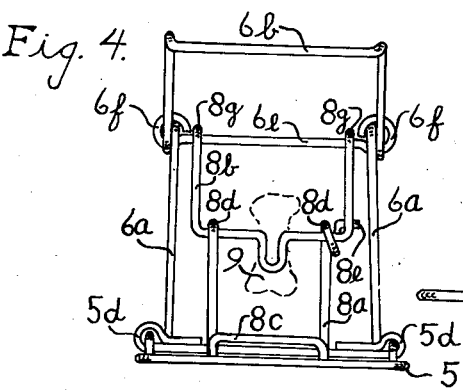
Figure 4 is a front elevational view of the trap as shown in Figure 3, the trap being shown as in "set" position.

Another positive advantage is found in the arrangement of the set tripping unit and the bait carrier which forms a part of the unit. The unit is located in the space between the base element 5 and the movable element 6, with the bait carrier extending forward from the toggle-joint and with the bait in the most advanced position. To trip the tripping unit, the joint must move rearwardly a distance sufficient to pass the dead center, whereupon the jaw 6 collapses under the action of spring 7, the critical period being that provided by the joint in moving from the position of Fig. 3 to the opposite side of the dead center position. As will be understood, pressure applied from the rear would not provide such movement of the joint; but the animal would not enter the trap from this direction, since, as indicated in Fig. 3, the bait is forward of the members 8a and 8b, with these tending to form a barrier to reaching the bait from the rear, as indicated in Figs. 4 and 1.

With the animal entering the trap from the front to reach the bait, certain conditions are present. Any pressure applied rearwardly, as when nibbling at the bait, would shift the joint to spring the trap; the same would be true if pressure is applied downwardly on the bait carrier; tripping could be avoided only by gripping both the upper and lower sides of the bait and pulling forward; grasping but one side of the bait would tend to rock the carrier. Animals such as rats and mice do not generally attempt to grab the bait and then instantly retreat. When the animals begin to gnaw the bait, pressure will inevitably develop and spring the trap. A similar result would follow should the bait be grasped and the attempt made to escape laterally. In other words, if any pressure, rearward or downward, is applied to the bait or bait carrier, the result is to swing the joint to the opposite side of the dead center and spring the trap, only pressure directed horizontally forward would prevent such spring. This condition is of definite advantage.

The terms "skeleton" and "skeletonized" used herein with respect to the formation, or frame, are designed more particularly to indicate a dominant characteristic of the present assembly, since it includes no large structural parts such as could tend to render the rodent suspicious. All of the structural parts are formed of wire, loosely articulated together so that there is but little physical structure present to distract the attention of the rodent from the bait, the latter presenting the largest compact unit of the entire assembly. For instance, in the commercial forms of common mouse traps of this particular type, the bottom of the trap is in the form of a wooden base to which the remaining parts are secured or on which they are mounted, a construction which can rouse the suspicions of a wary rodent. With the present structure even the base is in the form of a wire frame, with the articulations therewith of other parts all of loose type and least likely to rouse the suspicion of the rodent.

The term "zone" as used herein (end zone, mid-zone, coil zone, trigger zone) refers more particularly to specific locations, being used because of the particular structure of the assembly as described. For instance, the assembly has the rodent jaws providing their gripping action at the front end of the oblong base frame, the movable jaw being mounted at the other end of the frame with the spring actuator and manipulater (the handle) at the latter end, while the trigger is located intermediate the ends. Each of these portions may be considered as a zone of the whole, so that end-zone and mid-zone indicates positions relative to the base frame length, and coil zone, trigger zone can indicate the location of these parts in accordance with the above schedule. The trigger zone is thus more or less synonymous with mid-zone, the coil zone with the rear end zone, it being obvious that none of the zones is indicative of the complete assembly which includes all of the zones. Since the movable jaw or element is also an elongated frame with its sides carrying the loops by which it is pivotally mounted on the rear cross bar 5d', and with the handle in rear thereof, the location of such loops can be deemed the "pivot zone" of the element.

While wire construction is here shown, the trap may of course be made of any suitable material, such as sheet metal or wood, or partly of each, and while I have here shown and described specific structural features of the trap, these features may be changed as desired, within the scope of the claims.

I claim:

1. In animal trap assemblages, and in combination, a base element having a pair of cross rods spaced from each other and from the ends of the element, a tensioning spring, a movable element pivotally mounted on the rear cross rod and having a length to cooperate with the opposite end zone of the base element in producing the trap jaws, said movable element being under spring tension applied by the tensioning spring in its pivot zone and having a handle rearward of the spring, a two-member tripping unit connecting the movable element and the front cross rod, a bait carrier member one of the members supporting the bait and its carrier, the two members of the unit having a pivotal connection with each other in the mid zone of the unit length and respectively with the front cross rod and the movable element, said unit members being articulated to act in such manner to simulate a toggle joint action with respect to a straight-line position of the members with the joint movable to either side of such straight line position, and means for limiting the extent of unit movement in the direction of one of such sides to thereby permit setting of the trap from the rear end zone of the base element by handle manipulation when the trap is inclined downwardly with the front and zone downward, the set position of the unit and bait carrier presenting the bait in advance of the mid-zone of the unit to thereby produce trap collapse by pressure applied to the bait and its carrier in rearward and/or downward direction and in the general direction of the rear cross rod of the base element.

2. An assemblage as in claim 1 characterized in that the parts thereof are of skeleton formation and individually formed of wire shaped for assembly into the complete assemblage.

3. An assemblage as in claim 1 characterized in that the base element is in the form of a wire skeleton frame of rectangular contour with the frame having each of its side members formed with a pair of upwardly extending eyes spaced from each other and from the ends of the frame, corresponding eyes of one side member being transversely alined with those of the opposite side member, the respective cross rods of the element each being of wire, the body portion of which extends through a pair of the alined eyes with the end zones of the rods having an inward bend to form a loop interconnected with the eye to thereby provide a connection between eye and loop of loose characteristic.

4. An assemblage as in claim 3 characterized in that the tensioning spring has its body portion coiled with the coil loosely surrounding the rear cross rod, the spring having one end zone extending rearwardly and overlying the rear end member of the wire skeleton frame, the opposite end zone of the spring extending forwardly into overlying relation to a side portion of the movable element, the coil zone lying within the width dimensions of the movable element.

5. An assemblage as in claim 1 characterized in that the movable element is in the form of a wire skeleton frame of rectangular contour, with each side member of the frame formed with a pair of upwardly extending eyes spaced from each other and from the ends of the frame, the eyes of one side member being transversely alined with those of the opposite side member, the rear pair of alined eyes loosely embracing the rear cross rod of the base element, the forward pair of eyes carrying the front cross rod, the end zones of which are bent into loop form and interconnected with the eyes to thereby provide a connection between eye and loop of loose characteristic, said front cross rod forming a support for one of the members of the tripping unit, the end zone of the movable element frame in rear of the rear pair of eyes being bent upwardly at an angle to the plane of the frame to constitute such zone as a handle for manipulating the assemblage during setting of the trap.

6. An assemblage as in claim 5 characterized in that the width of the movable element frame is less than the width of the base element, with the length of the frame such as to locate its front end member forward of the front end of the base element when the trap is in its sprung position, the front end zone of the side members of the frame being bent downward to thereby position said end member in advance of and extending to a point below the base element in the sprung inactive position of the assemblage to thereby assure efficient jaw gripping action upon the animal when the assemblage is in active service.

RALPH J. RHINES.

REFERENCES CITED

The following references are of record in the file of this patent:

UNITED STATES PATENTS

| Number | Name | Date |
|---|---|---|
| 640,244 | Wever | Jan. 2, 1900 |
| 903,356 | Bushey | Nov. 10, 1908 |
| 937,360 | Cole | Oct. 19, 1909 |
| 1,029,992 | Harrington | June 18, 1912 |
| 1,053,597 | Haugen | Feb. 18, 1913 |
| 1,633,857 | Gonzalez | June 28, 1927 |